(12) United States Patent
Ishida (10) Patent No.: US 7,155,323 B2
(45) Date of Patent: Dec. 26, 2006

(54) ON-VEHICLE ELECTRONIC CONTROL APPARATUS WITH TIMER-BASED POWER SUPPLY

(75) Inventor: Shoichi Ishida, Novi, MI (US)

(73) Assignee: Denso Corporation, Kariya (JP)

( * ) Notice: Subject to any disclaimer, the term of this patent is extended or adjusted under 35 U.S.C. 154(b) by 182 days.

(21) Appl. No.: 10/737,750

(22) Filed: Dec. 18, 2003

(65) Prior Publication Data

US 2004/0143382 A1  Jul. 22, 2004

(30) Foreign Application Priority Data

Jan. 21, 2003  (JP)  ............................... 2003-012358

(51) Int. Cl.
*G06F 7/00* (2006.01)
*B60L 1/00* (2006.01)

(52) U.S. Cl. .................. 701/36; 307/9.1; 307/10.1; 307/10.7; 307/11; 307/43

(58) Field of Classification Search ............... 701/29, 701/33, 34, 36; 307/9.1, 10.1–10.3, 10.6, 307/10.7, 11, 15, 43; 361/1

See application file for complete search history.

(56) References Cited

U.S. PATENT DOCUMENTS

| | | | |
|---|---|---|---|
| 5,547,208 A | * | 8/1996 | Chappell et al. ............ 180/281 |
| 5,717,310 A | * | 2/1998 | Sakai et al. ................. 307/10.1 |
| 6,650,524 B1 | * | 11/2003 | Koyasu ..................... 361/93.8 |
| 6,744,359 B1 | * | 6/2004 | Wasilewski et al. ........ 340/467 |

* cited by examiner

*Primary Examiner*—Y. Beaulieu
(74) *Attorney, Agent, or Firm*—Posz Law Group, PLC (57) ABSTRACT

An auxiliary circuit continuously executes a timer counting operation under a condition that electric power is directly supplied from a vehicle battery to the auxiliary circuit. A main circuit receives no electric power during a waiting condition and hence minimizes current consumption. Only when a predetermined timer activation time is counted by the auxiliary circuit or an ignition key switch is turned on, electric power is supplied to the main circuit for allowing the main circuit to execute a zero point correction for load sensors.

18 Claims, 4 Drawing Sheets

ON-VEHICLE ELECTRONIC CONTROL APPARATUS WITH TIMER-BASED POWER SUPPLY

BACKGROUND OF THE INVENTION

The present invention relates to an electronic control apparatus installed in an automotive vehicle, and also relates to a passenger detecting apparatus for an automotive vehicle which judges the conditions of a passenger sitting on a vehicle seat and transmits the passenger conditions to a passenger protection apparatus equipped in the vehicle.

SUMMARY OF THE INVENTION

The present invention has an object to provide a vehicle electronic control apparatus and a vehicle passenger detecting apparatus which are capable of not only supplying accurate voltage and large current to external circuits in the electric power supply operation but also reducing current consumption during a waiting condition and also capable of assuring reliability of the apparatus by executing the self diagnosis.

In order to accomplish the above and other related objects, the present invention provides an electronic control apparatus for an automotive vehicle, including an auxiliary circuit which receives electric power directly supplied from a battery for continuously executing a timer counting operation, and a main circuit which receives electric power for occasionally executing predetermined processing only when a predetermined timer activation time is counted by the auxiliary circuit or an ignition key switch is turned on.

According to the arrangement of this invention, the auxiliary circuit continuously executes the timer counting operation under the condition that electric power is directly supplied from the battery to the auxiliary circuit. The main circuit receives no electric power during the waiting condition and hence minimizes the current consumption. Electric power is supplied to the main circuit only when the predetermined timer activation time is counted by the auxiliary circuit or the ignition key switch is turned on, thereby allowing the main circuit to execute the predetermined processing. The auxiliary circuit does not supply current to external circuits. Thus, the required current capacity of the auxiliary circuit is small. The current consumption during the waiting condition can be reduced. In general, a circuit having the capability of supplying large current to external circuits needs to have a large current capacity. Accordingly, the current flowing into the ground during the waiting condition is large. Current consumption becomes large. However, according to this invention, no electric power is supplied to the main circuit during the waiting condition. Thus, it becomes possible to surely reduce the current consumption. Furthermore, the auxiliary circuit executing the timer counting operation is provided separately from the main circuit. No switching circuit for external power supply is required. Supply of accurate voltage to the external circuits is feasible.

Preferably, the auxiliary circuit is arranged so as to output a timer count condition establishment signal when the timer activation time is counted and supply the timer count condition establishment signal to the main circuit. The main circuit includes a signal voltage comparator having an OR connection for inputting an ignition key switch ON signal and the timer count condition establishment signal. Electric power is supplied to the main circuit when a signal exceeding a predetermined threshold voltage is entered into the signal voltage comparator.

Accordingly, the main circuit receives no electric power during the waiting condition. Electric power is supplied based on an output signal of the signal voltage comparator which inputs both of the timer count condition establishment signal supplied from the auxiliary circuit and the ignition key switch ON signal.

Preferably, the ignition key switch ON signal is divided with resistors and entered in the signal voltage comparator. A dividing ratio of the resistors is changed when the auxiliary circuit outputs the timer count condition establishment signal. The timer count condition establishment signal is forcibly generated by the auxiliary circuit when the ignition key switch is turned on. And, function diagnosis of the auxiliary circuit is carried out by monitoring an input voltage change in the signal voltage comparator.

Accordingly, the auxiliary circuit forcibly generates the timer count condition establishment signal in response to turning on of the ignition key switch. The functions of the auxiliary circuit can be surely diagnosed by monitoring the input voltage change in the signal voltage comparator. This makes it possible to detect any malfunction or failure in the operations.

Furthermore, to accomplish the above objects, the present invention provides a passenger detecting apparatus for an automotive vehicle, including a load sensor for detecting a load applied on a vehicle seat, means for judging passenger conditions based on a load detection result detected by the load sensor, means for performing a zero point correction for the load sensor, which is activated at a predetermined timing after a waiting condition, an auxiliary circuit for receiving electric power directly supplied from a battery for continuously executing a timer counting operation, and a main circuit for receiving electric power only when a predetermined timer activation time is counted by the auxiliary circuit or an ignition key switch is turned on for occasionally executing predetermined processing including the zero point correction for the load sensor.

According to the arrangement of the vehicle passenger detecting apparatus of this invention, the auxiliary circuit continuously executes the timer counting operation under the condition that electric power is directly supplied from the battery to the auxiliary circuit. The main circuit receives no electric power during the waiting condition and hence minimizes the current consumption. Electric power is supplied to the main circuit only when the predetermined timer activation time is counted by the auxiliary circuit or the ignition key switch is turned on, thereby allowing the main circuit to execute the predetermined processing including the zero point correction for the load sensor. The auxiliary circuit does not supply current to external circuits. Thus, the required current capacity of the auxiliary circuit is small. The current consumption during the waiting condition can be reduced. In general, a circuit having the capability of supplying large current to external circuits needs to have a large current capacity. Accordingly, the current flowing into the ground during the waiting condition is large. Current consumption becomes large. However, according to this invention, no electric power is supplied to the main circuit during the waiting condition. Thus, it becomes possible to surely reduce the current consumption. Furthermore, the auxiliary circuit executing the timer counting operation is provided separately from the main circuit. No switching circuit for external power supply is required. Supply of accurate voltage to the external circuits including the load sensor is feasible. Furthermore, it is possible to surely execute the predetermined processing including the zero point correction for the load sensor at predetermined intervals. The judgment of passenger conditions can be accurately performed based on the load detection result.

Preferably, the auxiliary circuit is arranged so as to output a timer count condition establishment signal when the timer activation time is counted and supply the timer count condition establishment signal to the main circuit. The main circuit includes a signal voltage comparator having an OR connection for inputting an ignition key switch ON signal and the timer count condition establishment signal. And, electric power is supplied to the main circuit when a signal exceeding a predetermined threshold voltage is entered into the signal voltage comparator.

Accordingly, the main circuit receives no electric power during the waiting condition. Electric power is supplied based on an output signal of the signal voltage comparator which inputs both of the timer count condition establishment signal supplied from the auxiliary circuit and the ignition key switch ON signal.

Preferably, the ignition key switch ON signal is divided with resistors and entered in the signal voltage comparator. A dividing ratio of the resistors is changed when the auxiliary circuit outputs the timer count condition establishment signal. The timer count condition establishment signal is forcibly generated by the auxiliary circuit when the ignition key switch is turned on. And, function diagnosis of the auxiliary circuit is carried out by monitoring an input voltage change in the signal voltage comparator.

Accordingly, the auxiliary circuit forcibly generates the timer count condition establishment signal in response to turning on of the ignition key switch. The functions of the auxiliary circuit can be surely diagnosed by monitoring the input voltage change in the signal voltage comparator. This makes it possible to detect any malfunction or failure in the operations.

Furthermore, in the vehicle electronic control apparatus or in the vehicle passenger detecting apparatus of the present invention, it is preferable that the auxiliary circuit includes an auxiliary electric power circuit and an auxiliary microcomputer. The auxiliary electric power circuit is connected to the vehicle battery via an electric power supply line and regulates a battery voltage into a voltage supplied to the auxiliary microcomputer, and the auxiliary microcomputer is associated with a means for generating a clock used in the timer counting operation.

Similarly, it is preferable that the main circuit includes a main electric power circuit and a main microcomputer. The main electric power circuit includes a signal voltage comparator for comparing an input voltage and a reference voltage and generating an output signal based on the comparison result. The main microcomputer is activated in response to the output signal of the signal voltage comparator.

In this case, the input voltage supplied to the signal voltage comparator is changed when the predetermined timer activation time is counted by the auxiliary circuit or when the ignition key switch is turned on. The vehicle battery is connected to the signal voltage comparator of the main circuit via a path including the ignition key switch and a voltage dividing point of resistors.

Furthermore, it is preferable that the timer count condition establishment signal produced from the auxiliary circuit is supplied to a dividing ratio changing circuit which changes an input voltage entered into the signal voltage comparator of the main circuit.

Moreover, it is preferable that the main circuit is directly connected to external circuits or devices including the load sensor, thereby allowing the main control circuit to execute the predetermined processing including the zero point correction for the load sensor.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENT

Fundamental Arrangement

For the purpose of changing the expansion and development of an airbag in accordance with the type of passenger, it is possible to provide a vehicle passenger detecting apparatus equipped with a plurality of strain gauge type load sensors which are disposed on predetermined positions of the seat rails in a vehicle to measure the load (i.e., a passenger weight) acting on each vehicle seat. This passenger detecting apparatus not only judges the presence of a passenger sitting on a seat but also discriminates the physical differences of passengers, such as difference between adult and child.

Figure 5:
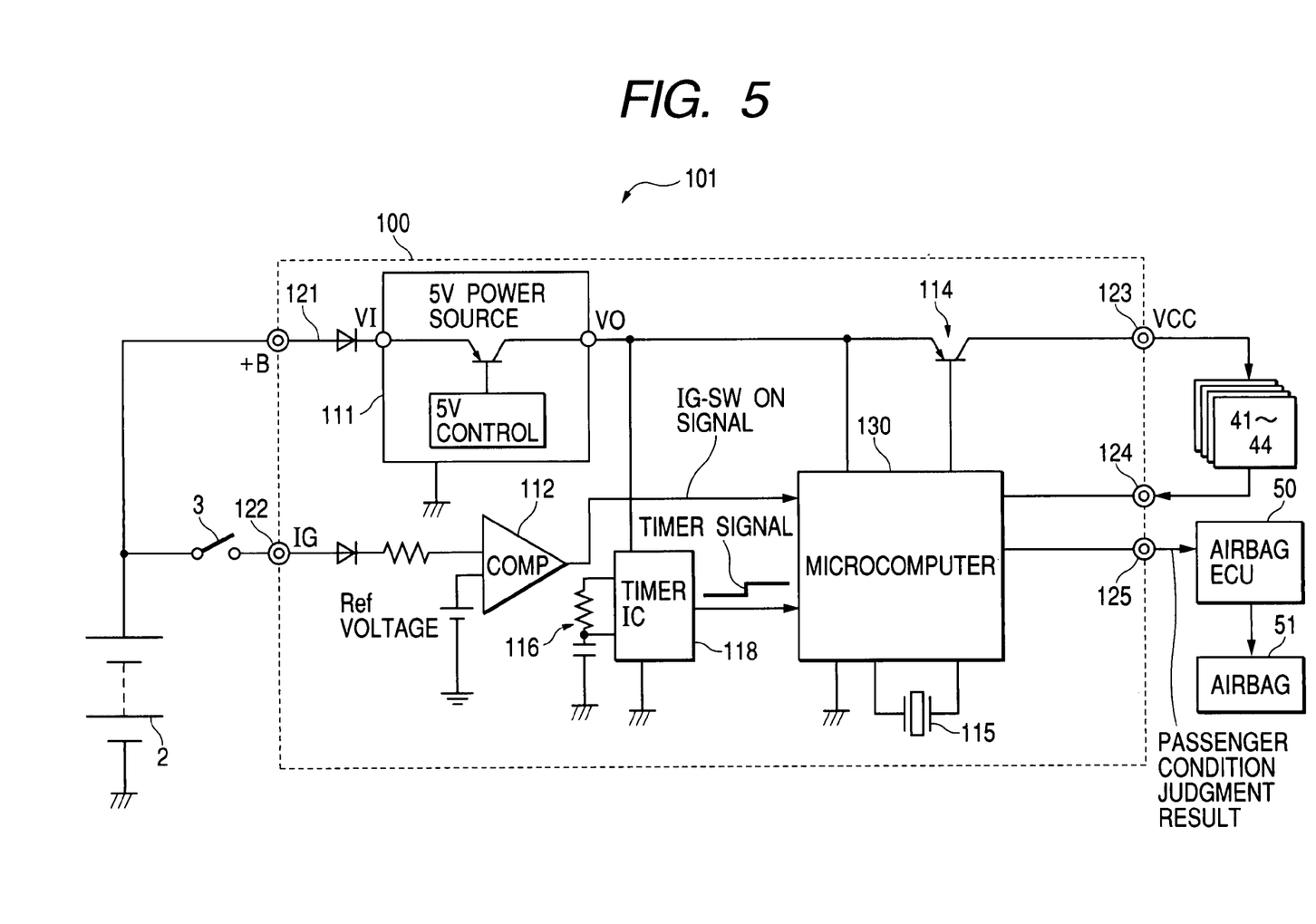
FIG. 5 is a block diagram showing an example of a hardware arrangement of a vehicle passenger detecting apparatus.

For example, FIG. 5 shows a vehicle passenger detecting apparatus 101 which chiefly includes an electric power circuit 111, a signal voltage comparator 112, a microcomputer 130, a timer circuit 118, an external power supply circuit 114 (e.g., switching circuit), and others. The electric power circuit 111 is connected to a vehicle battery 2 via an electric power supply line 121. The electric power circuit 111 has a VO terminal outputting a 5V voltage. The vehicle battery 2 is connected to the signal voltage comparator 112 via an ignition key switch (i.e., IG-SW) 3.

When the vehicle battery 2 is connected to the vehicle passenger detecting apparatus 101, electric power is supplied to the electric power circuit 111 via an electric power supply line 121. The electric power circuit 111 regulates a battery voltage and supplies the 5V voltage to the microcomputer 130 and to the timer circuit 118. In response to supply of 5V voltage, the microcomputer 130 starts its operation and continuously executes various operations in synchronism with the clock given by a quartz resonator 115. The microcomputer 130, after accomplishing predetermined calculations and controls, stops the clock of the quartz resonator 115 to reduce current consumption.

On the other hand, the timer circuit 118 starts its operation (i.e., timer counting operation) in response to the clock given from a CR oscillation circuit 116. When the timer circuit 118 has counted up a predetermined timer activation time, the timer circuit 118 outputs a timer signal representing establishment of count conditions for timer activation. The timer signal is supplied to the microcomputer 130 which executes external interrupt processing in response to entry of this timer signal. More specifically, the microcomputer 130 causes the quartz resonator 115 to start clock operation. The quartz resonator 115 is in a deactivated condition before the timer signal is entered into the microcomputer 130. Furthermore, if necessary, the microcomputer 130 activates the external power supply circuit 114 to apply a necessary voltage to load sensors 41 to 44 and other external circuits via an external power supply terminal 123. The microcomputer 130 receives load detection values detected by the load sensors 41 to 44 via an external signal input terminal 124. When a judgment based on the load detection values reveals that no passenger is sitting on a vehicle seat, the microcomputer 130 executes a zero point correction for respective load sensors. The zero point correction is a correction of the load detection values under a condition that no one is sitting on the seat. The microcomputer 130, after finishing the zero point correction for the load sensors, turns off the external power supply circuit 114 and stops the clock of quartz resonator 115 to reduce current consumption. Only the timer circuit 118 depending on the CR oscillation carries out the timer counting operation.

Upon turning on of the ignition key switch (IG-SW) 3, the battery voltage is applied to the signal voltage comparator 112 via an IG terminal 122. The signal voltage comparator 112 outputs the IG-SW signal when the input voltage of signal voltage comparator 112 exceeds a Ref voltage. The produced IG-SW signal causes the microcomputer 130 to execute the external interrupt processing. As the external interrupt processing, the microcomputer 130 causes the quartz resonator 115 to resume its clock operation. Furthermore, the microcomputer 130 turns on the external power supply circuit 114 to apply the voltage to the load sensors 41 to 44 and other external circuits via the external power supply terminal 123. The microcomputer 130 receives the load detection values detected by the load sensors 41 to 44 via the external signal input terminal 124 and makes a judgment of passenger conditions based on the load detection values, i.e., as to the presence of any passenger sitting on the seat or as to whether the passenger is adult or child. Then, the microcomputer 130 outputs the judgment result of passenger conditions to an airbag ECU 50 via an external signal output terminal 125. The timer circuit 118 continues the timer counting operation during the IG-ON condition.

When the ignition key switch (IG-SW) 3 is turned off, the voltage of IG terminal 122 reduces to 0V. Accordingly, the input voltage of the signal voltage comparator 112 decreases below the Ref voltage. Thus, generation of the IG-SW ON signal is stopped. In response to cease of the IG-SW ON signal, the microcomputer 130 terminates the judgment of the passenger conditions, turns off the external power supply circuit 114, and stops the clock operation of the quartz resonator 115.

According to the above-described vehicle passenger detecting apparatus 101, the timer circuit 118 produces the clock based on the CR oscillation during the waiting condition and performs the timer counting operation at a lower frequency, thereby reducing current consumption. Meanwhile, in the timer activated condition, the microcomputer 130 operates in response to the clock of quartz resonator 115 and executes the zero point correction for respective load sensors 41 to 44.

However, according to the above-described vehicle passenger detecting apparatus 101, the electric power circuit 111 continuously outputs the 5V voltage even in the waiting condition. Therefore, the current consumption is large. Furthermore, the electric power circuit 111 cannot satisfy two fundamental designing requirements of low current consumption in the internal circuit and large current supply to external circuits. Thus, the capability of the electric power circuit 111 for supplying electric power to the external circuits will be insufficient. Moreover, in an event that the timer circuit 118 is failed in the timer counting operation, the self diagnosis for detecting this kind of failure is unfeasible.

Preferred Embodiment

Hereinafter, a vehicle electronic control apparatus and a vehicle passenger detecting apparatus in accordance with a preferred embodiment of the present invention will be explained with reference to attached drawing.

Figure 1:
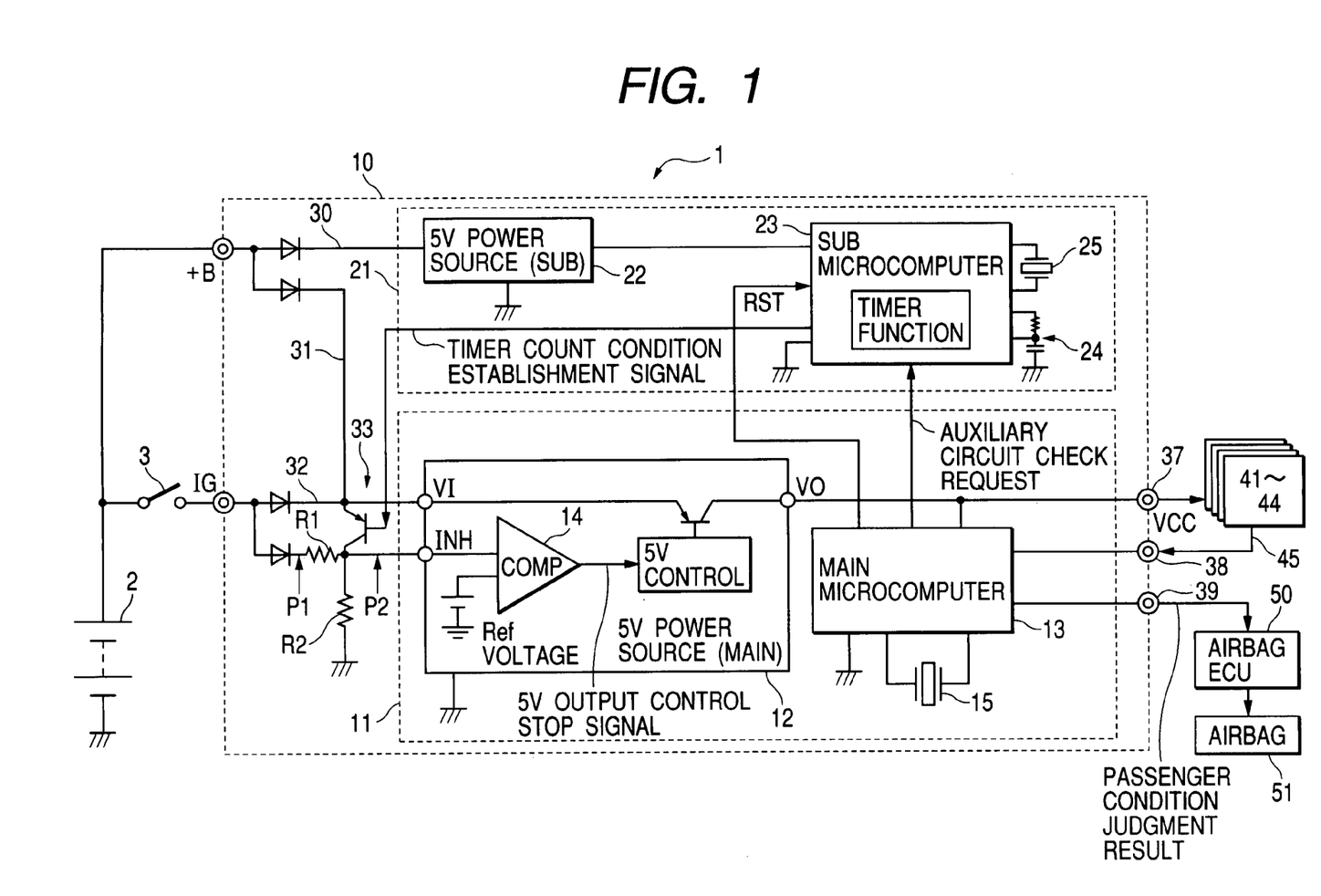
FIG. 1 is a block diagram showing a hardware arrangement of a vehicle passenger detecting apparatus in accordance with a preferred embodiment of the present invention.
Figure 2:
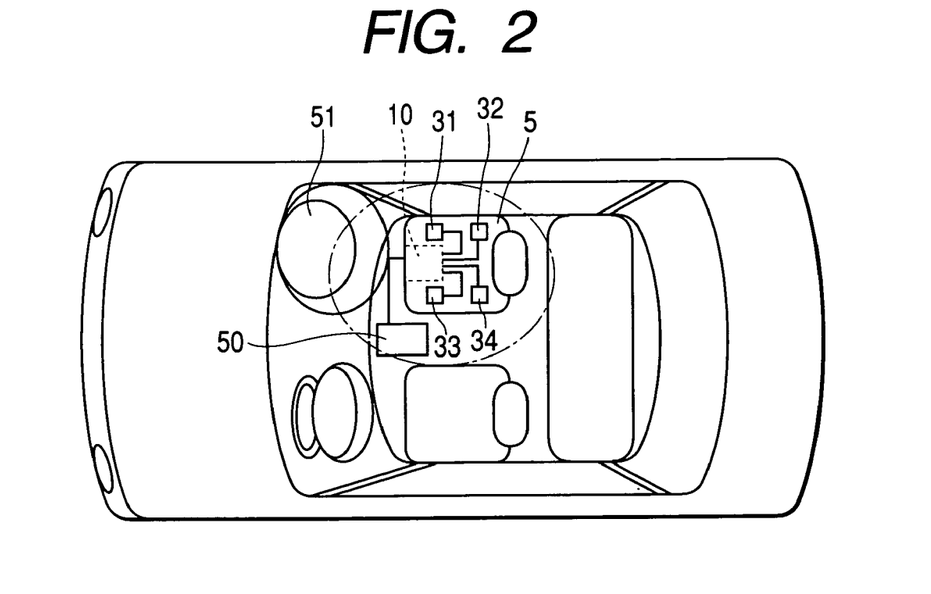
FIG. 2 is a plan view schematically showing the arrangement of various components of the vehicle passenger detecting apparatus which are disposed at predetermined positions in an automotive vehicle in accordance with the preferred embodiment of the present invention.
Figure 3:
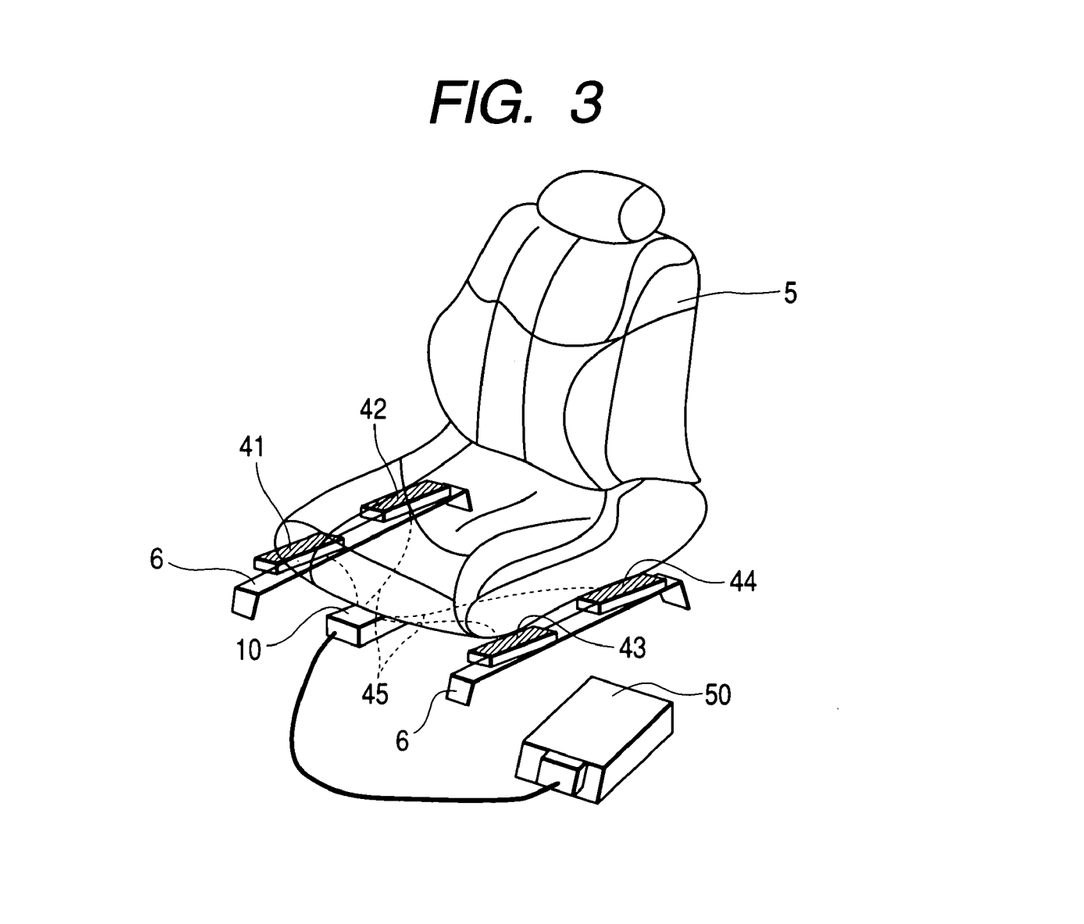
FIG. 3 is a perspective view showing a vehicle seat and its peripheral portion where the various components of the vehicle passenger detecting apparatus are disposed in accordance with the preferred embodiment of the present invention.
Figure 4:
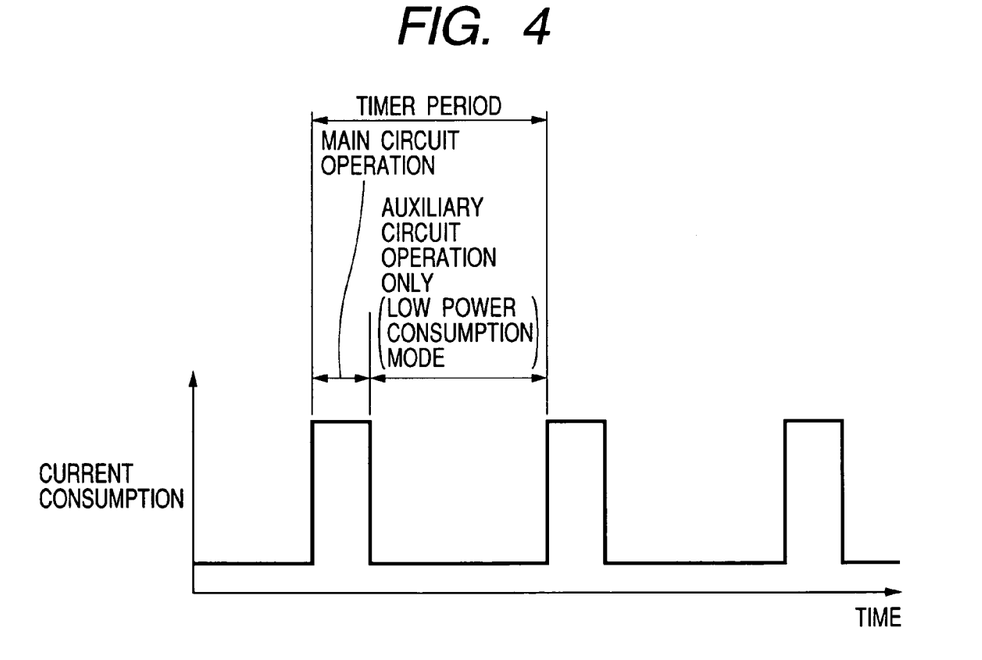
FIG. 4 is a graph showing an example of change in current consumption, caused by timer function of the apparatus shown in FIG. 1 for repetitively activating an auxiliary circuit operation and a main circuit operation in accordance with the preferred embodiment of the present invention.

FIG. 1 is a block diagram showing a hardware arrangement of a vehicle passenger detecting apparatus 1 in accordance with the preferred embodiment of this invention. FIG. 2 is a plan view schematically showing the arrangement of various components of the vehicle passenger detecting apparatus 1 which are disposed at predetermined positions in an automotive vehicle. FIG. 3 is a perspective view showing a vehicle seat and its peripheral portion (corresponding to a region indicated by an alternate long and short dash line in FIG. 2) where the various components of the vehicle passenger detecting apparatus 1 are disposed. FIG. 4 is a graph showing an example of change in current consumption by a passenger detecting ECU 10.

The vehicle passenger detecting apparatus 1, as shown in FIG. 1, includes a passenger detecting electronic control apparatus (hereinafter, referred to as passenger detecting ECU) 10 and a plurality of (e.g., a total of four) strain gauge type load sensors 41, 42, 43, and 44. The passenger detecting ECU 10 serves as vehicle electronic control apparatus of the present invention. The strain gauge type load sensors 41 to 44 serve as load sensors of the present invention.

The passenger detecting ECU 10 is disposed under a vehicle seat 5 (refer to FIGS. 2 and 3). As shown in FIG. 1, the passenger detecting ECU 10 is chiefly constituted by a main circuit 11 and an auxiliary circuit 21.

The main circuit 11 includes a main electric power circuit 12 and a main microcomputer 13. The main electric power circuit 12 includes a signal voltage comparator 14 for comparing an input voltage and a Ref (i.e., reference) voltage and generating an output signal based on the comparison result. When a Lo voltage is entered into an INH terminal, the signal voltage comparator 14 outputs a 5V output control stop signal (i.e., Lo voltage<Ref voltage). On the other hand, when a Hi voltage is entered into the INH terminal, the signal voltage comparator 14 produces no 5V output control stop signal (i.e., Hi voltage>Ref voltage). Thus, the main electric power circuit 12 continuously outputs a 5V voltage from its VO terminal.

The main microcomputer 13 chiefly includes CPU, ROM, RAM, A/D converters and others (not shown). When the 5V voltage is supplied from the main electric power circuit 12 to the main microcomputer 13, the CPU reads a passenger detection processing program, a load sensor zero point correction program, and a self diagnosis program from the ROM and executes these processing in an appropriate manner. Furthermore, the ROM stores various control data, including a vacant seat threshold and a passenger judgment threshold which are later-described. The RAM secures a region useable as work area for the CPU. The A/D converters convert the load data (i.e., analog voltage signals) into digital data when the load data are sent from respective strain gauge type load sensors 41 to 44 via a transmission line 45. Furthermore, the main microcomputer 13 includes an oscillation circuit 15 which produces an operation clock.

The auxiliary circuit 21 includes an auxiliary (or sub) electric power circuit 22 and an auxiliary (or sub) microcomputer 23. The auxiliary electric power circuit 22 is connected to a vehicle battery 2 via an electric power supply line 30. The auxiliary electric power circuit 22 regulates a battery voltage (e.g., 12V) and outputs a 5V voltage which is supplied to the auxiliary microcomputer 23. The auxiliary microcomputer 23 is associated with a CR oscillation circuit 24 and a quartz resonator 25. When the operation mode of the auxiliary microcomputer 23 is in a low current consumption mode during the waiting condition, the auxiliary microcomputer 23 operates in synchronism with the CR oscillation clock. Furthermore, the auxiliary microcomputer 23 also operates in synchronism with the clock of quartz resonator 25.

The vehicle battery 2 is connected to the auxiliary circuit 21 via an electric power supply line 30, and is also connected to the main circuit 11 via an electric power supply line 31. Furthermore, the vehicle battery 2 is connected to the main circuit 11 via another path including an ignition key switch 3 and a dividing point of dividing resistors R1 and R2.

The strain gauge type load sensors 41 to 44, as shown in FIGS. 2 and 3, are disposed at predetermined, e.g., front right, rear right, front left, and rear left, positions of seat rails 6 of the vehicle seat 5. Each of the load sensors 41 to 44 outputs an analog voltage signal representing a load applied on a sensor equipped portion of the vehicle seat 5. The strain gauge type load sensors 41 to 44 are directly connected to the passenger detecting ECU 10 via the transmission line 45. Each of the load sensors 41 to 44 starts its operation when an electric power voltage is supplied from the main electric power circuit 12 of the passenger detecting ECU 10, and transmits the analog voltage signal representing the detected load to the A/D converter of the passenger detecting ECU 10.

The airbag ECU 50 is a control apparatus for controlling expansion and development of an airbag 51 which serves as one of vehicle passenger protection apparatuses. As shown in FIGS. 2 and 3, the airbag ECU 50 is placed at a predetermined position in a passenger compartment of the vehicle. The airbag ECU 50 is connected to the passenger detecting ECU 10 via a communication line. The airbag ECU 50, when vehicle collision is detected based on a signal of a G sensor (not shown), immediately performs an expansion/development control for the airbag 51 based on the passenger condition judgment result transmitted via the external signal output terminal from the passenger detecting ECU 10. More specifically, the airbag ECU 50 selectively executes or stops the control for the airbag 51 whose expansion/development amount is changeable depending on the type of a detected passenger (i.e., adult or child).

The airbag ECU 50, for example, cancels the airbag expansion/development operation when the passenger conditions transmitted from the passenger detecting ECU 10 include the information that no one is sitting on the seat, even in a case that vehicle collision is detected. Meanwhile, the airbag ECU 50 executes a control for maximizing the expansion/development of the airbag 51 in response to detection of vehicle collision when the passenger conditions include the information that the passenger sitting on the seat is an adult. On the other hand, the airbag ECU 50 executes a control for suppressing or stopping expansion/development of the airbag 51 in response to detection of vehicle collision when the passenger conditions include the information that the passenger sitting on the seat is a child.

When the vehicle passenger detecting apparatus 1 executes the passenger detection processing, the load sensor zero point correction processing, and the self diagnosis processing, various portions of the vehicle passenger detecting apparatus 1 operate in the following manner. The CPU of main microcomputer 13 reads out the processing programs stored in the ROM and executes them to carry out the above-described each processing.

First of all, when the vehicle battery 2 is connected to the vehicle passenger detecting apparatus 1, electric power is supplied via the electric power supply line 30 to the auxiliary electric power circuit 22. The auxiliary electric power circuit 22 regulates the battery voltage (e.g., 12V) into a 5V voltage, and supplies the regulated voltage to the auxiliary microcomputer 23. In response to the applied voltage, the auxiliary microcomputer 23 starts its operation and executes various operations in synchronism with the clock of quartz resonator 25 (hereinafter, referred to as main clock). At the same time, the auxiliary microcomputer 23 is operable in synchronism with the clock of CR oscillation circuit 24 (hereinafter, referred to as sub clock). The auxiliary microcomputer 23, after finishing the predetermined initialization processing, stops the operation by the main clock to suppress current consumption and instead executes the timer counting operation with a sub clock timer.

The main microcomputer 13 periodically outputs an auxiliary circuit reset request signal (RST). The auxiliary circuit reset request signal is supplied to the auxiliary microcomputer 23. In response to this signal, the auxiliary microcomputer 23 executes the initialization processing in the same manner as in the moment of battery connection.

The sub clock timer of the auxiliary microcomputer 23 executes the timer counting operation. When the predetermined timer activation time is counted by the sub clock timer, the auxiliary microcomputer 23 outputs the timer count condition establishment signal which turns of a dividing ratio changing circuit 33. When the dividing ratio changing circuit 33 is in a turned-on condition, the INH terminal voltage of the main electric power circuit 12 exceeds the Ref voltage of the signal voltage comparator 14. The main electric power circuit 12 starts outputting the 5V voltage from its VO terminal. The 5V output of the main electric power circuit 12 is supplied to the main microcomputer 13. The main microcomputer 13 starts its operation. Furthermore, the voltage is supplied to the load sensors 41 to 44 or other external circuits via an external power supply terminal 37. The main microcomputer 13 inputs the load detection values detected by the load sensors 41 to 44 and entered via an external signal input terminal 38. When the vacancy of vehicle seat 5 is confirmed based on the load detection values, the main microcomputer 13 executes the zero point correction for the load sensors 41 to 44. The "zero point correction for the load sensors" in this invention is the processing for correcting a deviation of the load sensor output relative to a designed target value in a vacant seat condition (referred to as zero point). Such deviation is, for example, caused by temperature/moisture change or aging effects or the like.

The main microcomputer 13, after finishing the zero point correction for the load sensors, outputs an auxiliary circuit reset request signal (RST) to the auxiliary microcomputer 23. In this case, the auxiliary microcomputer 23 stops outputting the timer count condition establishment signal to start the operation from the beginning. When no timer count condition establishment signal is produced, the dividing ratio changing circuit 33 is deactivated. When the dividing ratio changing circuit 33 is deactivated, the INH terminal voltage of the main electric power circuit 12 becomes 0V and is accordingly lower than the Ref voltage of the signal voltage comparator 14. Hence, the main electric power circuit 12 stops supplying the 5V voltage. Accordingly, the passenger detecting ECU 10 is brought into the waiting condition. The auxiliary microcomputer 23 starts the counting for the next timer activation. Then, every time the timer activation condition is established by the sub clock timer of the auxiliary microcomputer 23, electric power is supplied to the main microcomputer 13 to activate the main microcomputer 13. As shown in FIG. 4, the passenger detecting ECU 10 periodically repeats the waiting condition of low current consumption (i.e., auxiliary circuit operation) and the activated condition of high current consumption (i.e., main circuit operation). For example, the timer activation is set to effect at the interval of approximately 1 hour. The zero point correction of the load sensors is executed for 10 seconds as wake-up operation (i.e., operation in the activated condition).

When the ignition key switch (IG-SW) 3 is turned on (hereinafter, referred to as IG-ON), electric power is supplied to a VI terminal of the main electric power circuit 12 via the electric power supply lines 31 and 32. Furthermore, the INH terminal voltage of the main electric power circuit 12 becomes a voltage level obtained by dividing the IG terminal voltage according to the ratio defined by the dividing resistor R1 and the dividing resistor R2. The INH terminal voltage of the main electric power circuit 12 exceeds the Ref voltage of the signal voltage comparator 14. The 5V output control stop signal is not produced. The main electric power circuit 12 outputs the 5V voltage from its VO terminal. The 5V output of the main electric power circuit 12 is supplied to the main microcomputer 13. The main microcomputer 13 starts its operation. Furthermore, the 5V voltage is supplied via the external power supply terminal 37 to the load sensors 41 to 44 and other external circuits. The main microcomputer 13 receives the load detection values from the load sensors 41 to 44 via the external signal input terminal 38. The main microcomputer 13 judges the passenger conditions based on the load detection values. More specifically, the main microcomputer 13 makes a judgment based on the load detection values as to the presence of any passenger sitting on the seat or as to whether the passenger is adult or child. For example, when a sum of the load detection values of the load sensors 41 to 44 is less than the vacant seat threshold, the main microcomputer 13 concludes that no one is sitting on the seat. Furthermore, when the sum of the load detection values of the load sensors 41 to 44 is not less than the vacant seat threshold and is less than the passenger judgment threshold, the main microcomputer 13 concludes that a child is sitting on the seat. When the sum of the load detection values of the load sensors 41 to 44 is not less than the passenger judgment threshold, the main microcomputer 13 concludes that an adult is sitting on the seat. Then, the main microcomputer 13 outputs the judgment result of passenger conditions to the airbag ECU 50 via an external signal output terminal 39.

Furthermore, the main microcomputer 13 outputs an auxiliary circuit check request signal to the auxiliary microcomputer 23. The auxiliary microcomputer 23 outputs the timer count condition establishment signal to turn on the dividing ratio changing circuit 33. In response to the turning-on action of the dividing ratio changing circuit 33, the INH terminal voltage of the main electric power circuit 12 changes. Accordingly, by monitoring the voltage between an IG power voltage monitoring point P1 and a division voltage monitoring point P2, it is possible to execute the self diagnosis as to whether the auxiliary circuit 21 and the dividing ratio changing circuit 33 are normal or abnormal. When any failure is detected as a result of the self diagnosis, the main microcomputer 13 transmits failure information to the airbag ECU 50 via the external signal output terminal 39. The auxiliary microcomputer 23 continues the timer counting operation during the IG-ON condition.

When the ignition key switch (IG-SW) 3 is turned off, the IG terminal voltage is not supplied to the dividing resistor R1 and to the dividing resistor R2. The IN terminal voltage of the main electric power circuit 12 becomes 0V. Accordingly, the input voltage of the signal voltage comparator 14 becomes equal to or less than the Ref voltage. The signal voltage comparator 14 outputs the 5V output control stop signal. The main electric power circuit 12 stops supplying the 5V voltage. Therefore, the main microcomputer 13 stops the operation. Meanwhile, the auxiliary microcomputer 23 continues the timer counting operation. Thus, the passenger detecting ECU 10 is brought into the waiting condition for the next timer activation.

As apparent from the foregoing description, according to this embodiment, the auxiliary circuit 21 always executes the timer counting operation under a condition that electric power is directly supplied from the vehicle battery 2 to the auxiliary circuit 21. The main circuit 11 (i.e., main microcomputer 13) receives no electric power in the waiting condition and accordingly reduces current consumption. When the predetermined timer activation time is counted by the auxiliary circuit 21 (i.e., auxiliary microcomputer 23), or when the ignition key switch 3 is turned on, the 5V electric power is supplied to the main circuit 11 to allow the main circuit 11 to carry out the zero point correction for the load sensors 41 to 44. The auxiliary circuit 21 does not supply current to the external circuits or devices. Hence, the required current capacity of the auxiliary circuit 21 is small. This is effective in substantially reducing the current consumption during the waiting condition. In general, a circuit having the capability of supplying large current to external circuits or devices needs to have a large current capacity. Accordingly, the current flowing into the ground during the waiting condition is large. Current consumption becomes large. However, according to the above-described embodiment, no electric power is supplied to the main circuit 11 during the waiting condition. Thus, it becomes possible to surely reduce the current consumption. Furthermore, the auxiliary circuit 21 executing the timer counting operation is provided separately from the main circuit 11. No switching circuit for external power supply is required. Supply of accurate voltage to the load sensors 41 to 44 and other external circuits or devices is feasible. Furthermore, it is possible to surely execute the zero point correction for the load sensors 41 to 44 at predetermined intervals. The judgment of passenger conditions can be accurately performed based on the load detection result.

Furthermore, according to the above-described embodiment, the auxiliary circuit 21 is arranged so as to output the timer count condition establishment signal when the timer activation time is counted and supply the timer count condition establishment signal to the main circuit 11. The main circuit 11 includes the signal voltage comparator 14 having an OR connection for inputting the ignition key switch ON signal and the timer count condition establishment signal. And, electric power is supplied to the main circuit 11 (i.e., main microcomputer 13) when a signal exceeding the predetermined threshold voltage is entered into the signal voltage comparator 14.

Furthermore, according to the above-described embodiment, the ignition key switch ON signal is divided with dividing resistors R1 and R2 and entered in the signal voltage comparator 14. The dividing ratio of the resistors R1 and R2 is changed when the auxiliary circuit 21 outputs the timer count condition establishment signal. The timer count condition establishment signal is forcibly generated by the auxiliary circuit 21 when the ignition key switch is turned on. And, function diagnosis of the auxiliary circuit 21 is carried out by monitoring the input voltage change in the signal voltage comparator 14. This makes it possible to detect any malfunction or failure in the operations.

The present invention is not limited to the above-described embodiment and is accordingly variously changeable within the range not exceeding the gist of the present invention.

Application of the present invention is not limited to the vehicle passenger detecting apparatus disclosed in the above-described embodiment. For example, the present invention is applicable to any other vehicle electronic control apparatus which is activated periodically by a timer. In this respect, the vehicle electronic control apparatus in accordance with the present invention is applicable to a vehicle anti-theft or burglarproof protection apparatus or others.

Furthermore, the main clock resonator of this invention is not limited to the quartz resonator disclosed in the above-described embodiment, and is accordingly replaceable with any other resonator utilizing mechanical resonance, such as ceramic resonator.

Moreover, transmission of the judgment result of passenger conditions is not limited to the airbag ECU 40. Accordingly, it is preferable to transmit the judgment result of passenger conditions to other vehicle passenger protection apparatus, such as a control apparatus for a pretensioner equipped seat belt or a seat belt wind-up apparatus using a motor.

As described above, according to the vehicle electronic control apparatus of the present invention, the auxiliary circuit continuously executes the timer counting operation under the condition that electric power is directly supplied from the battery to the auxiliary circuit. The main circuit receives no electric power during the waiting condition and hence minimizes the current consumption. Electric power is supplied to the main circuit only when the predetermined timer activation time is counted by the auxiliary circuit or the ignition key switch is turned on, thereby allowing the main circuit to surely execute the predetermined processing Furthermore, according to the vehicle passenger detecting apparatus of the present invention, it is possible to surely execute the zero point correction for the load sensors at predetermined intervals. The judgment of passenger conditions can be accurately performed based on the load detection result.

What is claimed is:

1. An electronic control apparatus to be mounted in an automotive vehicle having a battery and an ignition key switch to switch on/off electric power of the battery, comprising:
    an auxiliary circuit connected to the battery so as to restlessly receive the electric power from the battery and formed to have a timer for restlessly executing a timer counting operation to count a predetermined timer activation time; and
    a main circuit formed to be activated by the electric power from the battery and to execute predetermined processing only when the predetermined timer activation time has been counted by said auxiliary circuit or the ignition key switch is turned on.

2. The electronic control apparatus in accordance with claim 1, further comprising:
    a detection circuit being responsive to either a turn-on operation of the ignition key switch or an input of the timer count condition establishment signal and detecting a voltage to be produced from the electric power of the battery,
    wherein said auxiliary circuit is formed to output a timer count condition establishment signal when said timer activation time is counted by the timer and to supply said timer count condition establishment signal to said main circuit,
    said main circuit comprises a signal voltage comparator to which a reference threshold voltage and the voltage detected by the detection circuit are applied, whereby
    the electric power is supplied to said main circuit via the signal voltage comparator thereof when the detection circuit detects the voltage.

3. The electronic control apparatus in accordance with claim 2, wherein
    the detection circuit is formed such that
    a voltage of the battery is divided with resistors and entered in said signal voltage comparator,
    a voltage dividing ratio of said resistors is changed when said auxiliary circuit outputs said timer count condition establishment signal to the detection circuit, and
    said timer count condition establishment signal is forcibly generated by said auxiliary circuit when said ignition key switch is turned on, and
    the main circuit comprises a circuit performing function diagnosis of said auxiliary circuit by monitoring changes in the voltage detected by the detection circuit.

4. The electronic control apparatus in accordance with claim 1, wherein
    said auxiliary circuit includes an auxiliary microcomputer executing the timer counting operation, an auxiliary electric power circuit connected to the battery via an electric power supply line so as to receive electric power based on the electric power of the battery and regulate the received electric power into power having a voltage required for the auxiliary microcomputer, and
    means for generating a clock used in said timer counting operation carried out by the auxiliary microcomputer.

5. The electronic control apparatus in accordance with claim 1, further comprising:
    a detection circuit being responsive to either a turn-on operation of the ignition key switch or an input of the timer count condition establishment signal and detecting a voltage to be produced from the electric power of the battery,
    wherein said main circuit includes a main microcomputer executing the predetermined processing, and a main electric power circuit for supplying electric power to the main microcomputer, the main electric power circuit including a signal voltage comparator for comparing the voltage detected by the detection circuit and a reference voltage and generating an output signal based on a comparison result thereof, whereby the main electric power circuit is activated in response to said output signal of said signal voltage comparator.

6. The electronic control apparatus for in accordance with claim 1, wherein said main circuit is electrically directly connected to external circuits or devices, so as to execute said predetermined processing.

7. The electronic control apparatus in accordance with claim 2, wherein the detection circuit comprises:

a voltage dividing circuit having resistors connected between the ignition key switch and the ground and having a connection point providing a divided voltage depending on a resistance ratio between the resistors, the divided voltage serving as the voltage detected by the detection circuit; and a switch circuit receiving the timer count condition establishment signal, the switch circuit being connected between the battery and the connection point of the voltage dividing circuit, wherein no ignition key switch is disposed between the switch circuit and the battery, the switch circuit being switched on/off depending on based upon the timer count condition establishment signal.

8. The electronic control apparatus in accordance with claim 7, further comprising means for monitoring changes in the divided voltage at the connection point of the voltage dividing circuit, the divided voltage being for diagnosing whether or not the auxiliary circuit is in functional failure.

9. The electronic control apparatus in accordance with claim 5, wherein the detection circuit comprises:

a voltage dividing circuit having resistors connected between the ignition key switch and the ground and having a connection point providing a divided voltage depending on a resistance ratio between the resistors, the divided voltage serving as the voltage detected by the detection circuit; and a switch circuit for receiving the timer count condition establishment signal, the switch circuit being connected between the battery and the connection point of the voltage dividing circuit, wherein no ignition key switch is disposed between the switch circuit and the battery, the switch circuit being switched on/off based upon the timer count condition establishment signal.

10. The electronic control apparatus in accordance with claim 9, wherein said battery is electrically connected to said signal voltage comparator of said main circuit via a path including said ignition key switch and the voltage dividing circuit.

11. The electronic control apparatus in accordance with claim 9, further comprising means for monitoring changes in the divided voltage at the connection point of the voltage dividing circuit, the divided voltage being for diagnosing whether or not the auxiliary circuit is in functional failure.

12. An electronic control apparatus to be mounted in an automotive vehicle having a battery and an ignition key switch to switch on/off electric power of the battery, comprising:

a control circuit, operative in response to reception of predetermined electric power, for performing predetermined control processing;

a power supply circuit producing the predetermined electric power for the control circuit from the electric power of the battery;

an auxiliary circuit restlessly receiving the electric power from the battery, having a timer restlessly counting time, and outputting an establishment signal when the time count has reached a predetermined activation time; and a detection circuit detecting a condition in which either the timer signal is outputted from the auxiliary circuit or the ignition key switch is subjected to a turn-on operation thereof and allowing the power supply circuit to supply the predetermined electric power to the control circuit only when either the output of the timer signal or the turn-on operation of the ignition key switch is detected.

13. The electronic control apparatus in accordance with claim 12, wherein the detection circuit comprises:

a voltage dividing circuit having resistors connected between the ignition key switch and the ground and having a connection point providing a divided voltage depending on a resistance ratio between the resistors, the divided voltage serving as the voltage detected by the detection circuit; and a switch circuit receiving the establishment signal, being connected between the battery and the connection point of the voltage dividing circuit, wherein no ignition key switch is disposed between the switch circuit and the battery, the switch circuit being switched on/off depending on whether or not the establishment signal is received.

14. The electronic control apparatus in accordance with claim 13, further comprising means for monitoring changes in the divided voltage at the connection point of the voltage dividing circuit, the divided voltage being for diagnosing whether or not the auxiliary circuit is in functionally failure.

15. The electronic control apparatus in accordance with claim 13, further comprising means for monitoring changes in the divided voltage at the connection point of the voltage dividing circuit, the divided voltage being for diagnosing whether or not both the auxiliary circuit and the detection circuit are in functionally failure.

16. The electronic control apparatus in accordance with claim 15, wherein the power supply circuit comprises a voltage comparator for receiving the voltage at the connection point of the voltage dividing circuit and a reference voltage, comparing the voltage at the connection point with the reference voltage, and allowing the power supply circuit to supply the predetermined electric power to the control circuit only when the voltage comparator provides a compared result showing that the voltage at the connection point is larger than the reference voltage.

17. The electronic control apparatus in accordance with claim 16, wherein the switch circuit has an electric switching element triggered by the establishment signal and inserted between the battery and the connection point of the voltage dividing circuit.

18. An electronic control apparatus to be mounted in an automotive vehicle having a battery and an ignition key switch to switch on/off electric power of the battery, comprising:

control means, operative in response to reception of predetermined electric power, for performing predetermined control processing;

power supply means for producing the predetermined electric power for the control means from the electric power of the battery;

auxiliary circuit means for restlessly receiving the electric power from the battery, having a timer restlessly counting time, and outputting an establishment signal when the time count has reached a predetermined activation time; and detection means for detecting a condition in which either the timer signal is outputted from the auxiliary circuit means or the ignition key switch is subjected to a turn-on operation thereof and allowing the power supply means to supply the predetermined electric power to the control means only when either the output of the timer signal or the turn-on operation of the ignition key switch is detected.

* * * * *